United States Patent [19]
Schneider et al.

[11] Patent Number: 5,139,898
[45] Date of Patent: Aug. 18, 1992

[54] LITHIUM-IODINE BATTERY

[75] Inventors: Alan A. Schneider; James R. Hetmanski, both of Baltimore County; Darla J. Schrodt, Howard County, all of Md.

[73] Assignee: Mine Safety Appliances Company, Pittsburgh, Pa.

[21] Appl. No.: 610,027

[22] Filed: Nov. 7, 1990

[51] Int. Cl.⁵ .................... H01M 2/08; H01M 2/02
[52] U.S. Cl. .................................. 429/180; 429/181; 429/184; 429/185
[58] Field of Search ................ 429/180, 181, 184, 185

[56] References Cited
U.S. PATENT DOCUMENTS

| | | | |
|---|---|---|---|
| 3,874,929 | 4/1975 | Greatbatch | 429/181 |
| 4,071,662 | 1/1978 | Mead et al. | 429/185 |
| 4,182,028 | 1/1980 | Epstein et al. | 429/184 |

*Primary Examiner*—Anthony McFarlane
*Assistant Examiner*—Nhat D. Phan

[57] ABSTRACT

An improved lithium-iodine battery is resistant to failure caused by iodine vapor within the battery. The entire interface of the current collector with the lithium anode is isolated from other battery components by a rigid, electrical-insulating sleeve.

10 Claims, 2 Drawing Sheets

LITHIUM-IODINE BATTERY

FIELD OF THE INVENTION

This invention relates to lithium-iodine primary cells and more particularly to an improved configuration of such cells.

BACKGROUND OF THE INVENTION

Cells or batteries having a lithium anode and an iodine-containing cathode are well known and have been used extensively to provide power to low-power-demand electronic circuits, including heart pacers. Ordinarily the anode and cathode are brought into direct contact and a solid LiI electrolyte forms in situ to separate the anode and cathode while keeping them in electrochemical contact to generate power. Such cells are described, for example, in U.S. Pat. Nos. 3,660,163, 3,674,562, 4,148,975, 4,276,372, and 4,952,469. It is conventional in such cells to use a metal screen anode current collector and lead wire extending through the battery housing. To prevent short circuiting, U.S. Pat. No. 3,874,929 encloses the lead wire in a metal ferrule and insulating sleeve to seal it from migrating plastic or fluid cathode material. We have discovered another failure mechanism caused by iodine vapor in the cell even when the cathodes are in the solid state and do not migrate. If the iodine vapor reaches the interface of the current collector and anode, a lithium iodide film is formed at the interface that can separate the current collector from the anode. This results in a loss of electrical output from the battery.

SUMMARY OF THE INVENTION

It is an object of this invention to improved lithium-iodine battery of simple construction that is resistant to failure caused by iodine vapor within the battery. In accordance with the invention the entire interface of the current collector with the lithium anode is isolated from other battery components by a rigid, electrical-insulating sleeve. More particularly, the improved lithium-iodine cell comprises a metal housing, an iodine-containing cathode in electrical contact with the housing, a lithium anode in electrochemical contact with the cathode, means to insulate the lithium anode from the housing a metal anode current collector in contact with the lithium anode and comprising a lead extending through the housing, electrically insulating means to seal the lead to the housing, and sealing means to isolate the lithium-current collector interface consisting essentially of a rigid, electrical-insulating sleeve having a first edge sealingly enclosing at least a portion of the lead and a second edge enclosing the interface and pressed into the lithium anode.

DETAILED DESCRIPTION OF PREFERRED EMBODIMENTS

Figure 1:
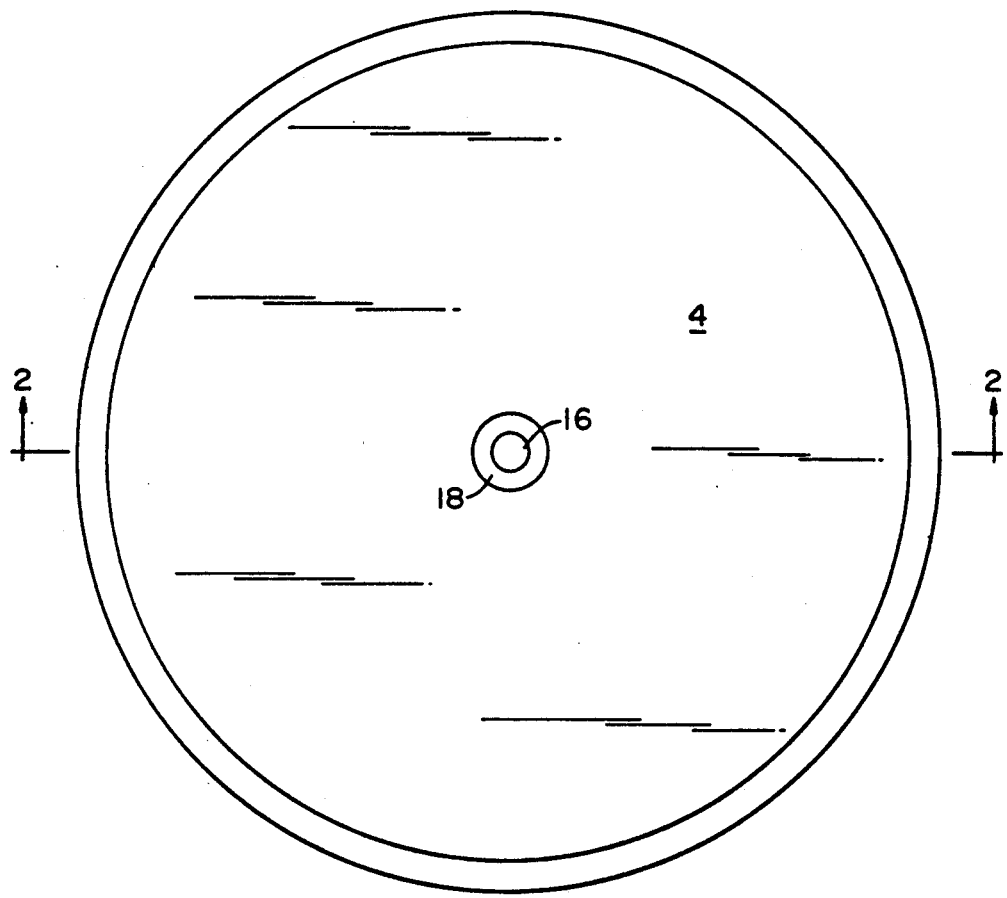
FIG. 1 is a plan view of a button cell in accordance with this invention.
Figure 2:
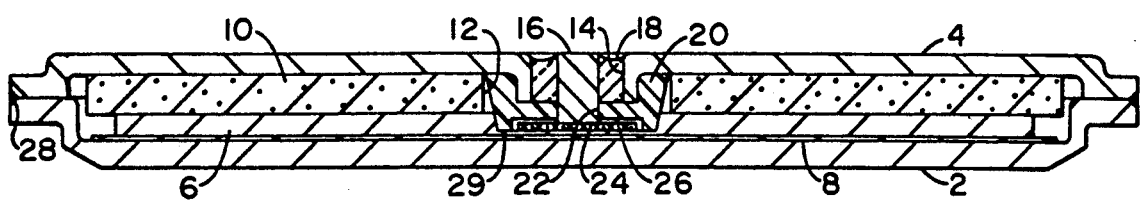
FIG. 2 is a vertical section on line 2—2 of FIG. 1.

A button cell of this invention is shown in FIG. 1 and FIG. 2. The metal housing, suitably 304 or 316 stainless steel, consists of a cup-shaped base member 2 and cover member 4. Lithium anode 6 is electrically insulated from the housing by insulator 8, for example, a polyimide such as Kapton. A solid state iodine-containing cathode 10 abuts the anode and is in electrical contact with the housing. The cathode is a disc with central opening 12 formed by compressing a granular mixture of iodine and an organic component capable of forming a charge transfer complex with iodine, such as for example, the cathodes described in U.S. Pat. No. 4,148,975 and 4,952,469.

The cover member has a central opening 14 to receive lead or pin 16 and glass seal 18. A polystyrene sleeve 20 has an opening defining edge 22 that is slightly smaller than the diameter of pin 16 to provide an interference fit. The sleeve is pressed on the pin forming a seal between the pin and the sleeve. The sleeve has a shallow depression 26 that receives the current collector screen 24; the screen is spot welded to pin 16 to complete the cover assembly. The pin is a conventional glass-sealing metal, for example 52 Alloy, and the current collection screen is expanded metal inert to lithium, such as nickel or stainless steel. The sleeve may be formed of any electrically insulating, nonporous, rigid material that is inert to iodine and lithium under normal cell conditions, such as, for example, ceramics or rigid plastics. As used herein, "rigid" means a material that is dimensionally stable and is highly resistant to cold flow deformation. The now preferred materials are polystyrene and polytrifluorochloroethylene, such as Kel-F ®. Polytetrafluoroethylene, polyethylene, polypropylene, Halar ® and similar materials that exhibit cold flow will not retain seal integrity and batteries made with sleeves of such materials show premature catastrophic failure. Such resins can be used as sleeves in this invention in rigid filled formulations.

To assemble the cell, the insulator 8, the disc lithium anode 6 and cathode 10 are sequentially positioned in the base housing member. The cover member is positioned, pressed against the base and sealed by weld 28. The assembly forces sleeve 20 into the lithium anode forming a tight seal along edge 29 of the sleeve that is in contact with the lithium. This seal, together with the seal of edge 22 against the pin, completely isolates the current collector-lithium interface from other cell components and prevents iodine vapor in the cell from reaching the interface and separating the anode from the current collector. In a typical cell of this type, the sleeve is embedded in the lithium to a depth of about 0.008-0.010 inches or about one-half the thickness of the lithium. The movement of sleeve into the lithium exposes fresh lithium surface that cold bonds to the plastic sleeve to form a tight, permanent seal. The insulator 8 may have a small dome which acts as a spring to aid in the sealing of the sleeve to the anode; the dome collapses under assembly forces and does not consume space in the battery.

Figure 5:
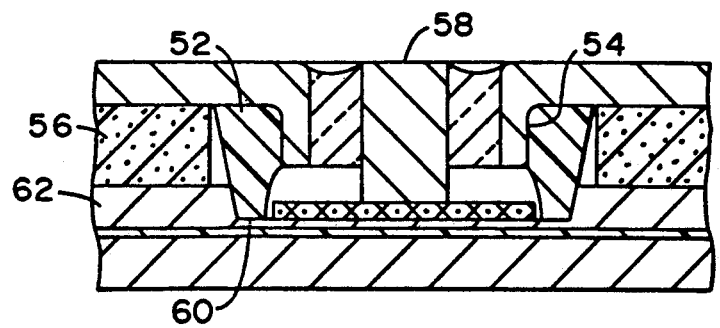
FIG. 5 is a partial section of a modified button cell similar to that of FIGS. 1 and 2.

FIG. 5 illustrates a button cell as above described but with a modified sleeve seal. The rigid plastic sleeve 52 has an edge 54 that is sealed by interference fit to the housing intermediate of the cathode 56 and the anode current collector lead 58. The edge 60 of the sleeve is embedded in the lithium anode 62, thereby isolating the lead and the current collector-lithium interface from the cathode.

Figure 3:
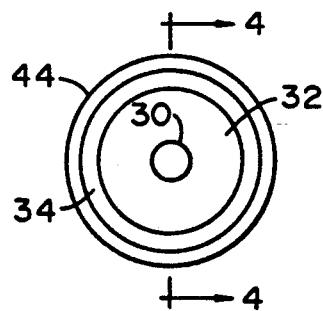
FIG. 3 is a plan view of a resistor-shaped cell in accordance with this invention.
Figure 4:
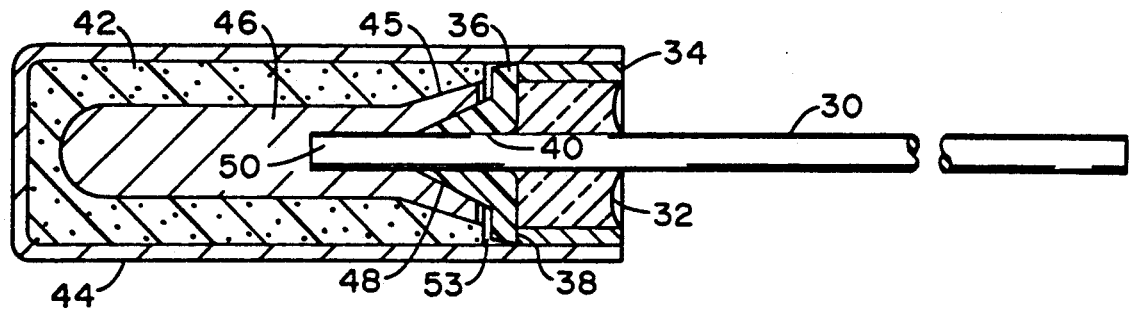
FIG. 4 is a vertical section on line 4—4 of FIG. 3.

In the embodiment illustrated in FIG. 3 and FIG. 4, the plastic sleeve is insert molded directly onto a battery subassembly incorporating the lead and glass seal. The seal subassembly consists of lead 30, extending through glass seal 32 that is also sealed to the annular metal header 34. Polystyrene sleeve 36 is insert molded directly onto the subassembly forming a tight seal at edge 38 with the header and a redundant seal at edge 40 with the lead. Cathode 42 is formed of granular cathode material compacted directly in the metal housing 44. The cathode is shaped with a cavity having a flared top 45 to accept lithium anode 46. In assembly, a cylindrical piece of lithium is first inserted into the cathode cavity and pressed to insure a tight fit. The seal subassembly with plastic sleeve is inserted into the housing further compressing the lithium anode in tight engagement with the cathode. The compressed lithium extrudes into the space between the insulator 36 and the cathode 42; the dimensions are such that after extrusion of the lithium there is an unfilled space 53 which prevents contact of the lithium with case 44 or annular metal header 34. The portion 50 of the lead extending from the sleeve serves as the current collector and forms a cold bond to the lithium. The flared surface portion 48 of the sleeve cold bonds to the lithium to isolate the current collector-lithium interface. The outer surface of header 34 and the corresponding inner surface of the housing are coated with solder so that a cold weld seal is formed when the seal assembly is inserted into the housing. Alternatively, the header and housing may be sealed by brazing or welding.

We claim:

1. A lithium-iodine cell comprising:
   a metal housing,
   an iodine-containing cathode in electrical contact with the housing,
   a lithium anode in electrochemical contact with the cathode,
   means to insulate the lithium anode from the housing
   a metal anode current collector in contact with the lithium anode forming an interface and comprising a lead extending through the housing,
   electrically insulating means to seal the lead to the housing, and
   sealing means to isolate the lithium-current collector interface consisting essentially of a rigid electrical-insulating sleeve having a first edge sealingly enclosing at least a portion of the lead and a second edge enclosing the interface and pressed into the lithium anode.

2. A cell of claim 1 in which the cathode is solid.

3. A cell of claim 1 in which the sleeve is polystyrene.

4. A cell according to claim 1 in which the first edge comprises an opening in the sleeve that is slightly smaller than the lead and the lead passes through the opening.

5. A cell according to claim 1 in which the sleeve is insert molded to the lead.

6. A button cell according to claim 1 in which the housing comprises a metal cup and a metal cover peripherally sealed together to form a cavity,
   a stack of cell elements under compression within said cavity comprising sequentially a disc of electrical insulating material, a disc lithium anode, a disc cathode having an opening therethrough,
   an anode current collector comprising a lead extending through the cover having a collector portion adapted to pass through the cathode opening and contact the anode,
   electrically insulating means to seal the lead to the cover,
   a rigid plastic sleeve positioned between the cathode and the current collector having a first edge sealingly engaging the lead and a second edge embedded in the anode and surrounding the collection portion.

7. A tubular cell according to claim 1 comprising a tubular housing having a closed end and an open end,
   a solid cathode spaced from the open end and having a central cavity, the cathode being in electrical contact with the housing,
   a lithium anode within said cavity and in electrochemical contact with said cathode,
   a cover assembly comprising an electrical insulating seal, a metal lead extending through the seal, said seal having an inner and outer surface and being adapted to sealingly fit within the open end of the housing, a rigid plastic sleeve covering the inner surface of the seal and enclosing a portion of the lead immediately extending from the inner surface of the seal,
   the plastic sleeve and the lead being embedded in the lithium anode thereby isolating the portion of the lead in contact with the lithium.

8. A cell according to claim 7 in which the plastic sleeve is insert molded.

9. A cell according to claim 7 in which the plastic sleeve is tapered toward the inner end of the lead.

10. A cell according to claim 7 in which the seal comprises a metal ring sealed to the housing.

* * * * *